United States Patent [19]
Norlander et al.

[11] 4,427,307
[45] Jan. 24, 1984

[54] ROTARY DRILL BIT

[75] Inventors: Lars G. Norlander, Surte; Erik T. Brask, Sandviken; Rolf R. Morén, Sandviken, all of Sweden

[73] Assignees: Sandvik Aktiebolag, Sandviken; Aktiebolaget SKF, Goteborg, both of Sweden

[21] Appl. No.: 308,893

[22] Filed: Oct. 5, 1981

[30] Foreign Application Priority Data

Dec. 3, 1980 [SE] Sweden ................................ 8008471

[51] Int. Cl.³ .......................... F16C 19/38; F16C 33/36
[52] U.S. Cl. ...................................... 384/93; 308/215; 308/234; 384/94
[58] Field of Search ............................ 384/93, 94, 92; 308/214, 215, 187, 202, 207 R, 234, 231

[56] References Cited

U.S. PATENT DOCUMENTS

| 1,296,940 | 3/1919 | Fleming | 308/187 |
| 3,303,898 | 2/1967 | Bercaru | 384/93 |
| 4,023,869 | 5/1977 | Caldwell | 308/214 |
| 4,298,079 | 11/1981 | Norlander et al. | 384/94 |

Primary Examiner—Lenard A. Footland
Attorney, Agent, or Firm—Burns, Doane, Swecker & Mathis

[57] ABSTRACT

A rotary drill bit comprising a roller cutter (12) which is rotatably carried over a bearing system. The bearing system comprises at least one roller bearing (16). Fluid is supplied to the bearing system for flushing and lubricating and when needed cooling thereof. For purposes of ensuring suitable fluid flow through the roller bearing (16) and thus ensuring satisfactory lubrication thereof the rollers in the roller bearing (16) are provided with an axial bore (25).

13 Claims, 3 Drawing Figures

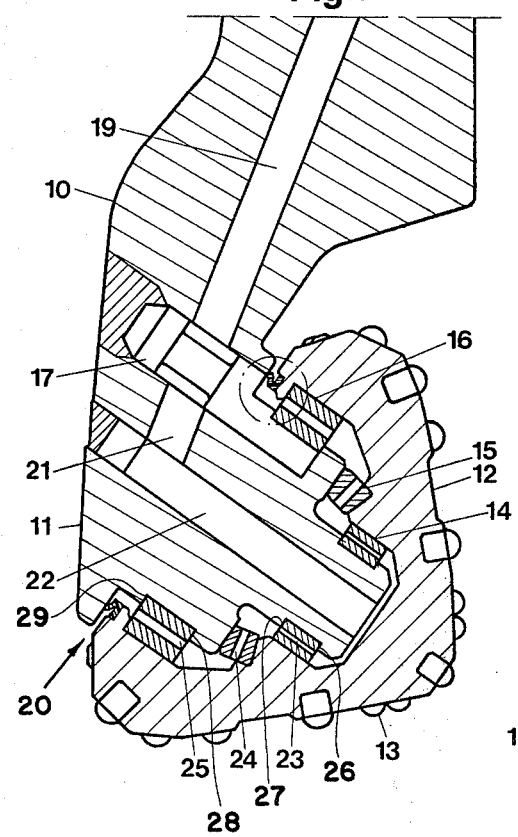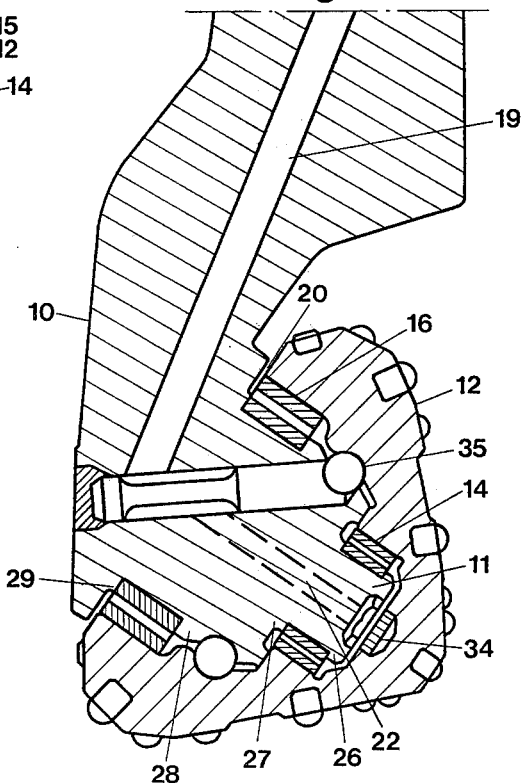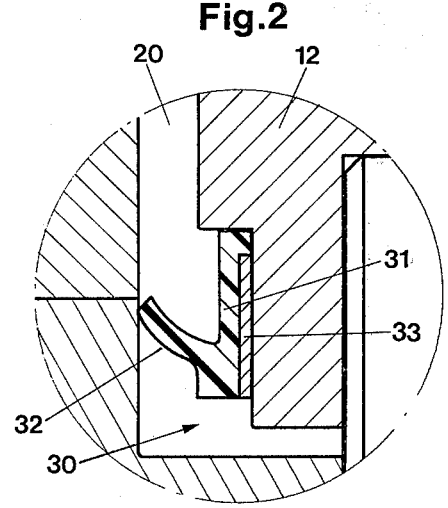

ROTARY DRILL BIT

This invention relates to a rotary drill bit of the type comprising at least one roller cutter which is rotatably carried over a bearing system, which comprises at least one roller bearing. Passage means is provided in the bit body for supplying fluid, such as compressed air, to the bearing system for flushing and lubricating and when needed cooling thereof.

In rotary drill bits having conical roller cutters which are rotatable on the bit body by means of roller bearings, a satisfactory lubrication of the roller bearings is of utmost importance. Therefore, lubricating means is usually delivered to the fluid which is supplied to the bearing system. During passage through the bearing system the fluid has to flow between the rollers in the roller bearings. The available through-flow cross sectional area is usually considerably limited, due to for instance guiding flanges on the bearing pin and/or the roller cutter for guiding the rollers. The restricted cross section area causes a high flow velocity of the fluid, which means that there is a large risk that lubricant adhering to the rollers and their races is removed therefrom and then follows the fluid out through the annular gap between the roller cutter and the bit body, thus resulting in a deteriorated lubrication of the roller bearing.

The object of the present invention is to provide a rotary drill bit in which there is ensured a satisfactory lubrication of the roller bearings incorporated in the bearing system.

This and other objects of the invention are attained by giving the invention the characterizing features stated in the appending claims.

The invention is described in detail in the following description with reference to the accompanying drawings in which two embodiments are shown by way of example. It is to be understood that these embodiments are only illustrative of the invention and that various modifications thereof may be made within the scope of the claims.

In the drawings,

FIG. 1 shows in section a roller cutter and a bearing pin associated therewith in a rotary drill bit according to the invention.

FIG. 2 shows on an enlarged scale the encircled portion in FIG. 1.

FIG. 3 shows in section a roller cutter and a bearing pin associated therewith in an alternative embodiment of a rotary drill bit according to the invention.

Corresponding details in the two embodiments have been given the same reference numeral.

FIG. 1 shows a drill bit for rotary drilling in rock and earth formations. The rotary drill bit comprises in conventional manner three separate legs, which form part of the bit body. A rotary drill bit of this type is disclosed in U.S. Pat. No. 4,194,794. For the sake of clarity only one leg 10 is shown in FIG. 1. The lowermost portion of the leg 10 is formed as a bearing pin 11 upon which a roller cutter 12 is rotatably carried. The roller cutter 12 is provided with cutting means 13, in the illustrated embodiment hard metal inserts which are press-fitted in corresponding holes in the roller cutter, so as to break and crush rock and earth formations when the bit is rotated and moved downwards the hole being drilled.

The bearing system for the rotatable supporting of the roller cutter 12 comprises a forward roller bearing 14 at the top of the roller cutter, i.e. the end of the roller cutter opposite the leg 10, a conical axial roller bearing 15 and a rear bearing 16. The rollers in the roller bearing 16 are inserted through a loading bore in the leg 10 after the roller cutter 12 being mounted on the bearing pin 11, whereupon a plug 17 is inserted into the bore and secured therein by welding.

A passage 19 is provided in the leg 10 for supplying fluid, such as compressed air, to the bearing system. Normally, this fluid is intended on the one hand to cool the bearing system, and on the other to clean same and prevent impurities from entering thereinto through the annular gap 20 between the roller cutter 12 and the leg 10. In certain cases, however, the fluid might be warmer than the bearings in the bearing system which means that the primary function of the fluid, besides lubrication of the bearings, is to maintain the bearing system clean.

The fluid from the passage 19 is conducted via the plug 17 through passages 21, 22 in the bearing pin to the bearing space of the bearings 14, 15, 16, whereupon the fluid flows past these bearings toward the gap 20. The through-flow area available between the rollers in the bearings is limited due to guiding flanges 26–29 on the roller cutter 12 and the bearing pin 11, said guiding flanges being adapted to guide the rollers. Since a certain minimum fluid flow is required, due to factors such as supply of sufficient amount of lubricant, removal of heat and flushing of the bearing system, there is a risk that the fluid flow velocity will become unacceptable high, thereby tearing away lubricant adhered to the bearing rollers and their races and conveying this lubricant out through the gap 20. The lubricant is supplied to the fluid in the passage 19 in a manner known per se, for instance from a lubricant reservoir built-in in the drill bit.

For purposes of increasing the through-flow area through the bearings and thus lowering the flow velocity the rollers in the bearings 14, 15, 16 are according to the invention provided with bores 23, 24, 25 extending axially therethrough.

Additionally it has been found that the axial bores 23, 24, 25 decrease those stress concentrations otherwise arising at both ends of the rollers.

Preferably, the diameter of the axial bores 23, 24, 25 should be less than 40% of the diameter of the rollers in the bearings, with preference for values less than 30% thereof. If the diameter of the bores is larger, there is a risk that too much fluid, and thus too large amount of lubricant, passes through the bores. Secondly, surface tension arising in the inner wall of the bores might be too large.

Due to the fluid flow out through the gap 20 the risk is decreased that impurities might enter into the bearing system. For purposes of further decreasing this risk an annular sealing means 30 having check valve function might be mounted in the gap 20. The sealing means 30 comprises a rigid body portion 31 and a tongue 32 attached thereto and extending radially outwards. Due to the tongue 32 the fluid may flow out through the gap 20 under flow resistance. At the same time, however, large resistance is maintained against penetration of impurities into the bearing system. The body portion 30 of the sealing means is stiffened by means of a metallic plate 33 and is attached to the roller cutter 12, for instance glued thereto.

In the embodiment according to FIG. 3 the axial forces arising during drilling are taken up by a friction bearing 34. The roller cutter 12 is secured on the bearing pin 11 in a manner known per se by means of a ball bearing 35.

We claim:

1. Rotary drill bit comprising a bit body, at least one roller cutter rotatably carried on the bit body by means of a bearing system, said bearing system comprising at least one roller bearing including a plurality of rollers, passage means is provided in the bit body for supplying a lubricant-containing gas flow to the bearing system for flushing and lubricating and cooling thereof, gas outlet means disposed downstream of said bearing system with reference to the direction of gas flow for discharging said gas flow from said drill bit, at least one of the rollers in the roller bearing being provided with a bore which extends axially therethrough for conducting the gas flow therethrough to reduce the velocity of the gas flow and minimize the tendency for the gas flow to strip lubricant from the rollers.

2. A rotary drill bit according to claim 1, wherein the roller bearing is a radial bearing.

3. A rotary drill bit according to claim 1, wherein the roller bearing is an axial bearing.

4. A rotary drill bit according to claim 1, wherein the passage means terminates in the bearing space in front of the roller bearing thereby maintaining a fluid flow through the roller bearing toward said gas outlet means.

5. A rotary drill bit according to claim 4, wherein the bearing system comprises a forward radial roller bearing, a rear radial bearing, and an intermediate axial roller bearing, all said roller bearings having rollers provided with axial bores.

6. A rotary drill bit according to claim 1, wherein the diameter of the bore is less than 40% of the diameter of a roller in the roller bearing.

7. A rotary drill bit according to claim 1, comprising flanges in one of said bit body and roller cutter for securing the bearings against movement sidewards, wherein the two opposite openings of the axial bore are not covered by said flanges.

8. A rotary drill bit according to claim 1, wherein said gas outlet comprises an outer portion of an annular gap between said bit body and said roller cutter, an annular sealing means mounted in said annular gap, said sealing means being arranged to allow said gas to flow out from the gap under low flow resistance while maintaining large resistance against penetration of impurities into the bearing system.

9. A rotary drill bit according to claim 8, wherein the sealing means comprises an elastically yieldable tongue arranged to be acted upon by said gas flow to discharge same, said tongue being attached to a considerably more rigid body portion at its inner end and extending radially outwards to its free outer end.

10. A rotary drill bit according to claim 9, wherein the body portion of the sealing means is attached to the roller cutter.

11. A rotary drill bit according to claim 1, wherein the diameter of said bore is less than 30% of the diameter of a roller in the roller bearing.

12. Rotary drill bit comprising a bit body, at least one roller cutter which is rotatably carried on the bit body by means of a bearing system, said bearing system comprising at least one axial roller bearing, and wherein passage means is provided in the bit body for supplying fluid to the bearing system for flushing and lubricating and cooling thereof, characterized in that at least one of the rollers in the roller bearing is provided with a bore which extends axially therethrough for purposes of ensuring suitable fluid flow through the roller bearing, and thus satisfactory lubrication thereof.

13. Rotary drill bit comprising a bit body, at least one roller cutter which is rotatably carried on the bit body by means of a bearing system, said bearing system comprising at least one roller bearing, and wherein passage means is provided in the bit body for supplying fluid to the bearing system for flushing and lubricating and cooling thereof, characterized in that at least one of the rollers in the roller bearing is provided with a bore which extends axially therethrough for purposes of ensuring suitable fluid flow through the roller bearing, and thus satisfactory lubrication thereof, the passage means terminating in the bearing space in front of the roller bearing, thereby maintaining a fluid flow through the roller bearing toward an annular gap between the bit body and the roller cutter, the bearing system comprising a forward radial bearing, a rear radial bearing, and an intermediate axial roller bearing, all said roller bearings having rollers provided with axial bores.

* * * * *